(12) United States Patent
Hsieh et al.

(10) Patent No.: US 11,633,067 B2
(45) Date of Patent: Apr. 25, 2023

(54) METAL CUTTING BOARD

(71) Applicant: TIMAS TITAN CO., LTD., Taipei (TW)

(72) Inventors: Han-Chun Hsieh, Taipei (TW); Han-Chieh Hsieh, Taipei (TW)

(73) Assignee: TIMAS TITAN CO., LTD., Taipei (TW)

( * ) Notice: Subject to any disclaimer, the term of this patent is extended or adjusted under 35 U.S.C. 154(b) by 0 days.

(21) Appl. No.: 17/496,770

(22) Filed: Oct. 8, 2021

(65) Prior Publication Data
US 2022/0304518 A1 Sep. 29, 2022

(30) Foreign Application Priority Data
Mar. 29, 2021 (TW) .................................. 110203357

(51) Int. Cl.
*A47J 47/00* (2006.01)
(52) U.S. Cl.
CPC .................................. *A47J 47/005* (2013.01)
(58) Field of Classification Search
CPC ..................................................... A47J 47/005
See application file for complete search history.

(56) References Cited

U.S. PATENT DOCUMENTS

| | | | |
|---|---|---|---|
| 6,293,458 B1* | 9/2001 | Sarnoff | A47J 36/022 220/573.1 |
| 2005/0263013 A1* | 12/2005 | Siegel | A21B 3/15 99/426 |
| 2015/0208860 A1* | 7/2015 | Parr | A47J 36/10 220/573.1 |

* cited by examiner

*Primary Examiner* — Nirvana Deonauth
(74) *Attorney, Agent, or Firm* — Li & Cai Intellectual Property Office

(57) ABSTRACT

A metal cutting board is integrally formed by a metal plate body and includes a first plate body, a second plate body, and an inclined connecting portion. The second plate body is disposed around a periphery of the first plate body, the second plate body and the first plate body are parallel to each other, and the second plate body and the first plate body are positioned on planes of different heights. The inclined connecting portion is circumferentially disposed between the first plate body and the second plate body. The first plate body, the second plate body, and the inclined connecting portion are integrally formed from the metal plate body and are connected to form a shallow tray structure.

7 Claims, 3 Drawing Sheets

METAL CUTTING BOARD

CROSS-REFERENCE TO RELATED PATENT APPLICATION

This application claims the benefit of priority to Taiwan Patent Application No. 110203357, filed on Mar. 29, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a metal cutting board, and more particularly to a metal cutting board that can be used for processing food or a metal cutting board that can be used as a food tray.

BACKGROUND OF THE DISCLOSURE

Materials that are commonly used for conventional cutting boards include wood, plastic, and glass. However, wood, plastic, and glass cutting boards all have their own disadvantages. For example, the wood cutting boards are prone to wear and tear and are susceptible to breeding of bacteria, plastic cutting boards can easily have knife marks and food residues left thereon, and glass cutting boards are too smooth in texture, which easily causes the knife to produce noise when striking against it, and causes the knife to slide which damages an edge thereof.

Traditional cutting boards are rarely made of metal materials, and the main reasons for this include: common metal materials easily oxidize, metal odors can cling to ingredients, and knives are more likely to be damaged when used on a conventional metal cutting board. Furthermore, if a thicker metal plate is used to manufacture the cutting board, the cutting board is likely to be too heavy. However, if a thinner metal plate is used to manufacture the cutting board, a flatness of the cutting board can easily be affected by warpage.

Therefore, how to overcome the above-mentioned shortcomings through an improvement in structural design of a metal cutting board has become one of the important issues to be solved in the industry.

SUMMARY OF THE DISCLOSURE

In response to the above-referenced technical inadequacies, the present disclosure provides a metal cutting board in view of the shortcomings of conventional wood, plastic, glass, and metal cutting boards.

In one aspect, the present disclosure provides a metal cutting board. The metal cutting board includes a first plate body, a second plate body, and an inclined connecting portion. The first plate body has a uniform thickness. The second plate body is disposed around a periphery of the first plate body, the second plate body and the first plate body are parallel to each other, and the second plate body and the first plate body are positioned on planes of different heights. The inclined connecting portion is circumferentially disposed between the first plate body and the second plate body, an inner edge of the inclined connecting portion is connected to an outer edge of the first plate body, and an outer edge of the inclined connecting portion is connected to an inner edge of the second plate body. The first plate body, the second plate body, and the inclined connecting portion are integrally formed from a metal plate body, so that the metal cutting board forms a shallow tray structure.

In an exemplary embodiment, an outer edge of the second plate body has a folded edge that is bent towards a bottom surface of the metal cutting board. In an exemplary embodiment, a thickness of the metal plate body is between 0.5 mm and 2 mm.

In an exemplary embodiment, a flatness error of the first plate body and the second plate body is less than 1.5 times the thickness of the metal plate body.

In an exemplary embodiment, a ratio of a height to a width of the inclined connecting portion is within a range from 1:1 to 1:5.

In an exemplary embodiment, a height of the inclined connecting portion is between 2 times and 15 times the thickness of the metal plate body.

In an exemplary embodiment, an area of the first plate body is not less than 70% of an area of the metal cutting board.

Therefore, one of the beneficial effects of the present disclosure is that, through having the inclined connecting portion and the second plate body formed on an outer periphery of the first plate body, and through controlling a slope and a height of the inclined connecting portion, the metal cutting board provided by the present disclosure forms the shallow tray structure and is suitable for use as a cutting board and a food tray.

Furthermore, through the abovementioned technical means, the metal cutting board of the present disclosure can also achieve antibacterial and anti-sticking effects. In addition, a residual stress after the metal cutting board is formed can be reduced, so as to maintain a good flatness.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
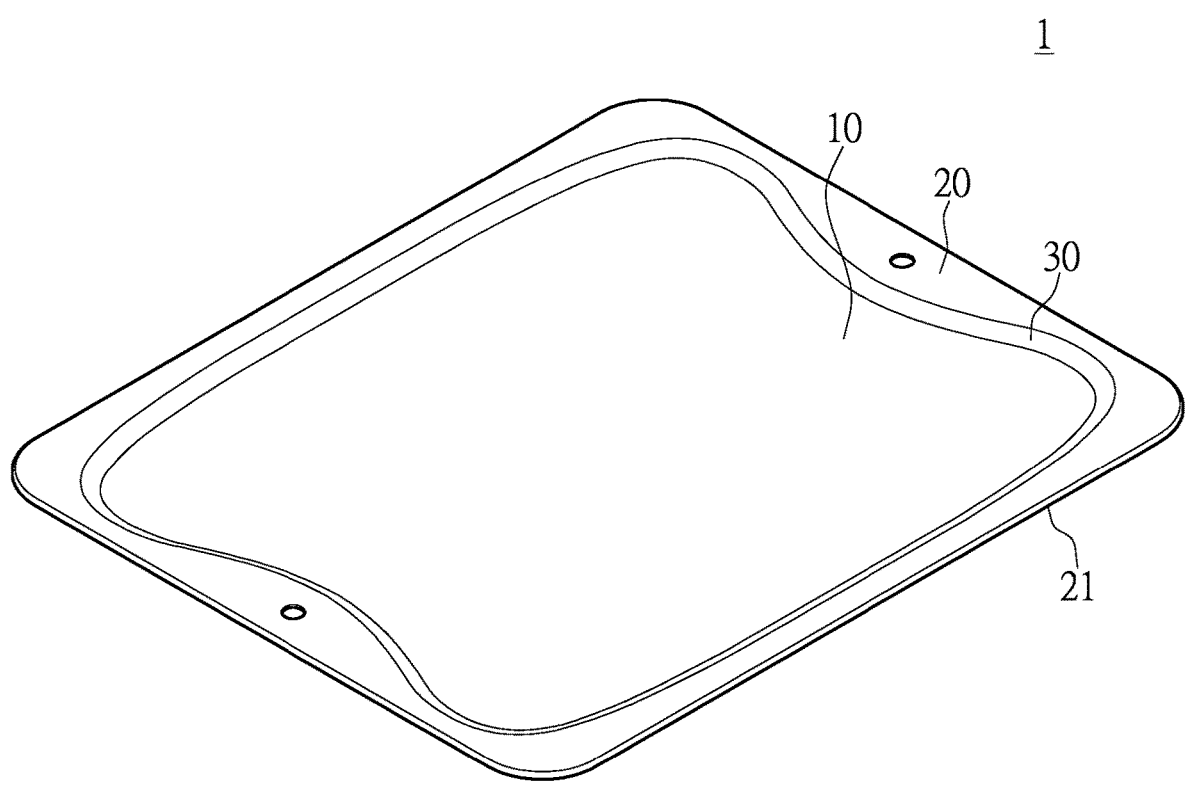
FIG. 1 is a schematic perspective view of a metal cutting board of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 4, the present disclosure provides a metal cutting board that can be used as a food cutting board or a food tray. As shown in FIG. 1, a metal cutting board 1 of the present disclosure is integrally formed by a metal plate body, which mainly includes a first plate body 10, a second plate body 20, and an inclined connecting portion 30 that is connected between the first plate body 10 and the second plate body 20. The first plate body 10 is a main body portion of the metal cutting board 1 of the present disclosure. The first plate body 10 has a uniform thickness and forms a flat plate body having a large area. The inclined connecting portion 30 is connected to an outer edge of the first plate body 10 and extends outwardly and upwardly, so that the inclined connecting portion 30 forms a continuous inclined surface that surrounds a periphery of the first plate body 10. The second plate body 20 is formed by extending outwardly from an outer edge of the inclined connecting portion 30 in a horizontal direction, and an outer edge of the second plate body 20 is further bent downward to form a folded edge 21 that surrounds an outer periphery of the second plate body 20.

Figure 2:
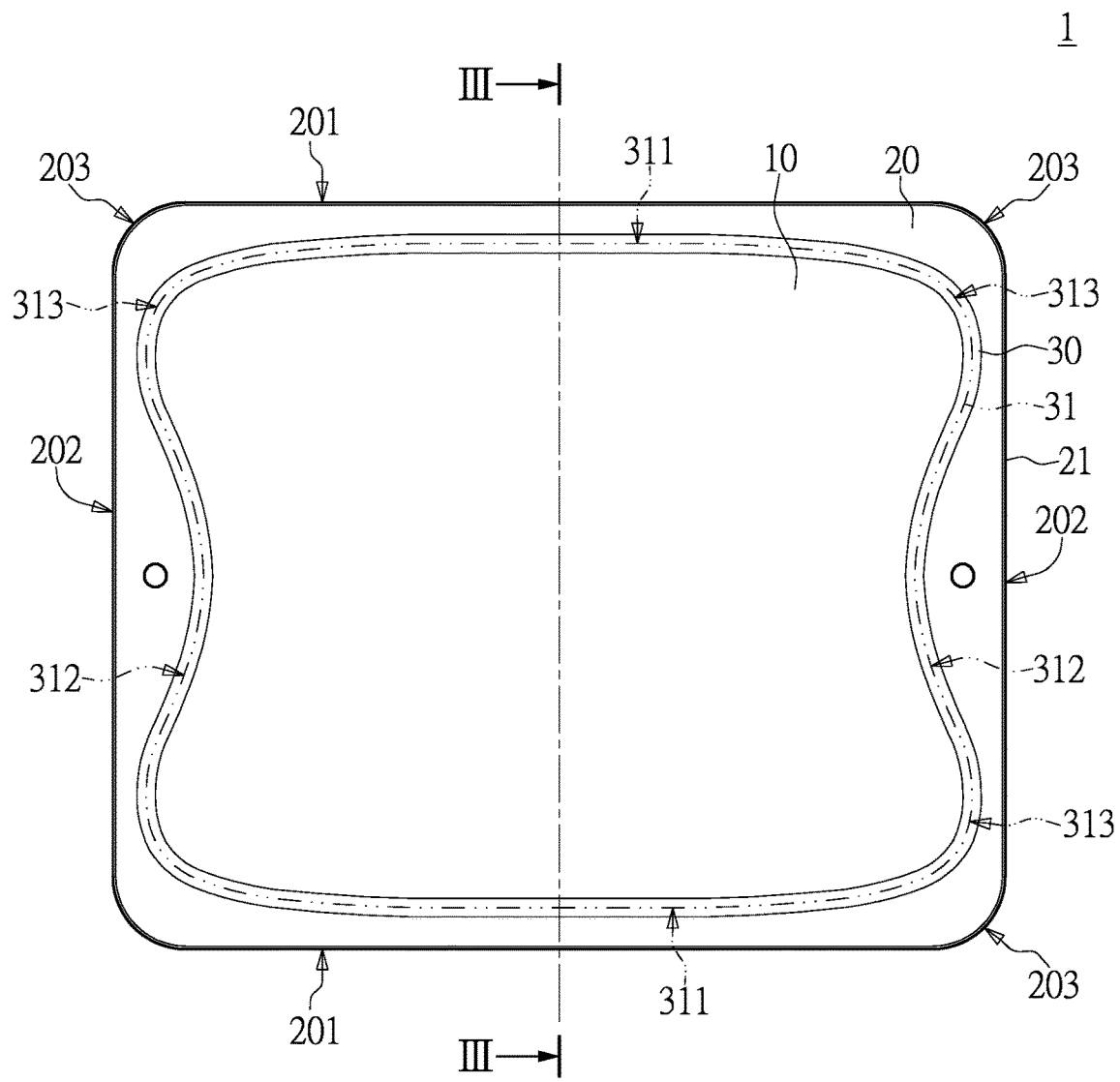
FIG. 2 is a schematic top view of the metal cutting board of the present disclosure.

As shown in FIG. 2, when observed from a top view, a contour of an outer periphery of the metal cutting board 1 of the present disclosure is roughly in a shape of a rectangle. Two long sides 201 (such as two first sides) that are parallel to each other, two short sides 202 (such as two second sides) that are parallel to each other and perpendicular to the two long sides 201, and four corner portions 203 that are connected to adjacent junctions of the two long sides 201 and the two short sides 202 are defined by the outer periphery of the second plate body 20 of the metal cutting board 1. In addition, the inclined connecting portion 30 extends along a curved path 31 that is not parallel to a contour of the outer periphery of the second plate body 20, and is surroundingly arranged between an outer periphery of the first plate body 10 and an inner periphery of the second plate body 20. Moreover, the inclined connecting portion 30 has an equal width along its entire length.

As shown in FIG. 2, the curved path 31 includes two first curves 311 that are adjacent to each of the two long sides 201, two second curves 312 that are adjacent to each of the two short sides 202, and a curved connecting portion 313 that is connected to a junction of the two first curves 311 and the two second curves 312. Each of the two first curves 311 forms an arc-shaped curve and has two ends being away from a corresponding one of the two long sides 201 and a middle portion being curved in a direction towards the corresponding one of the two long sides 201. Similarly, each of the two second curves 312 also forms an arc-shaped curve and has two ends being close to a corresponding one of the two short sides 202 and a middle portion being curved in a direction away from the corresponding one of two short sides 202.

Through the above arrangement, an extended path of the inclined connecting portion 30 and the outer periphery of the second plate body 20 can be formed in a non-parallel state, such that directions of stresses caused by bending corners at connection points between the inclined connecting portion 30, the first plate body 10, and the second plate body 20 are distributed in different angles, thereby preventing the metal cutting board 1 from being warped due to the stresses caused by the bending corners.

Figure 3:
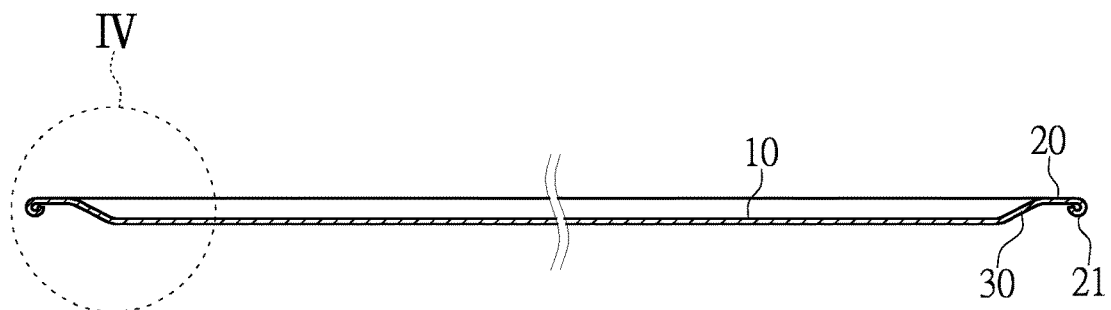
FIG. 3 is a schematic cross-sectional view of the metal cutting board of the present disclosure.
Figure 4:
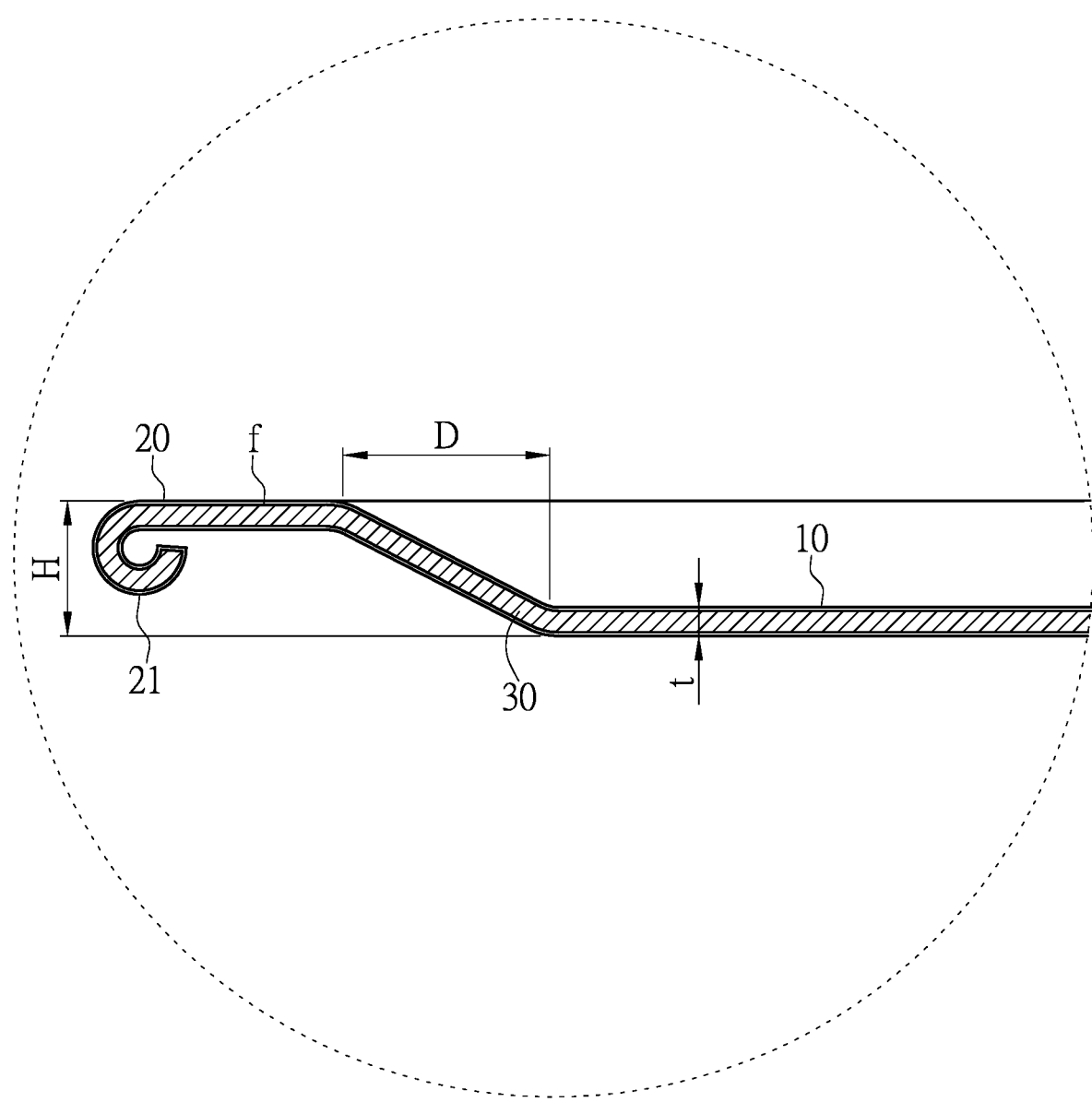
FIG. 4 is a partially enlarged cross-sectional view of the metal cutting board of the present disclosure.

As shown in FIG. 3 and FIG. 4, when observed along a cross-section of the metal cutting board 1, the inclined connecting portion 30 and the second plate body 20 form the continuous inclined surface and a horizontal flange surrounding the outer periphery of the first plate body 10. Therefore, the metal cutting board 1 of the present disclosure forms a shallow tray structure with an upward opening.

The metal cutting board 1 of the present disclosure can be used as a cutting board for processing food or a tray for placing food. Therefore, in terms of structural design, the metal cutting board 1 needs to be able to provide functions of a cutting board or a food tray.

In order to achieve the abovementioned purpose, certain details regarding the structural design and manufacturing process of the metal cutting board 1 of the present disclosure require special attention. In order to provide the functions of processing food and the tray for placing food, an area of the first plate body 10 of the metal cutting board 1 of the present disclosure is not less than 70% of an area of the metal cutting board 1, so that a large flat portion is formed. In this way, a large flat surface for placing and processing food can be provided.

Furthermore, the metal cutting board 1 is made of the metal plate body having a thickness ranging from 0.5 mm to 2 mm, so as to be lightweight and convenient to use.

Moreover, in an exemplary embodiment of the present disclosure, the metal cutting board 1 is made of a titanium metal plate having a thickness ranging from 0.5 mm to 2 mm. Further, a titanium oxide film layer f is formed on a surface of the titanium metal plate, so that the metal cutting board 1 of the present disclosure has antibacterial and anti-sticking characteristics, and is not susceptible to breeding of bacteria. At the same time, due to characteristics of the titanium metal, no sharp noise is generated when the metal cutting board 1 is struck upon by a knife, a sharpness of an edge of the knife can avoid being damaged, and knife marks are not easily left on a surface of the metal cutting board 1.

It should be noted that, in an exemplary embodiment of the present disclosure, a thickness of the titanium oxide film layer f is greater than 10 nanometers (nm), and the titanium oxide film layer f can be titanium dioxide ($TiO2$) or other types of titanium and oxygen compounds. In a process for producing the titanium oxide film layer f, the metal cutting board 1 can be heated up to a temperature of 800° C. in a vacuum furnace, and the temperature is maintained for a predetermined period of time. After the metal cutting board 1 is annealed, an oxygen-containing working gas is introduced thereto, so that the titanium oxide film layer f is formed on the surface of the metal cutting board 1, but the present disclosure is not limited thereto. For example, the titanium oxide film layer f can also be formed on the surface of the metal cutting board 1 through an electrochemical processing technique.

In the present disclosure, the titanium oxide film layer f is formed by the process mentioned above, so that the thickness of the titanium oxide film layer f is greater than a thickness of a native oxide layer formed by a reaction of the titanium metal and oxygen in the air, and a density of a film thus formed is also greater than that of the naturally-formed native oxide layer. In this way, a better antibacterial and anti-sticking effect can be achieved.

More specifically, the process for producing the titanium oxide film layer f on the metal cutting board 1 of the present disclosure can be implemented together with a homogenization treatment process for eliminating an internal stress of the metal cutting board 1. In the homogenization treatment process, the metal cutting board 1 is heated to a temperature from 500° C. to 800° C. in a vacuum environment provided by the vacuum furnace, and the metal cutting board 1 is maintained at the temperature from 500° C. to 800° C. for 1 to 3 hours. Next, oxygen is introduced into the vacuum furnace, and the temperature is maintained between 650° C. and 800° C. for 1 to 3 hours for oxidation, so that the titanium oxide film layer f is formed on the surface of the metal cutting board 1. The heating is then stopped, so that the metal cutting board 1 is cooled down in the air.

It should be noted that, in the homogenization treatment process, a heating temperature of the metal cutting board 1 reaches above a recrystallization temperature of the titanium metal and is lower than a β-phase transformation point temperature of the titanium metal, so that a lattice structure of the metal cutting board 1 is formed into a homogenized α-phase crystal structure, and the titanium oxide film layer f is formed after the surface of the metal cutting board 1 is oxidized. Moreover, since a solubility of oxygen in a titanium metal crystal of the α-phase crystal structure can reach over 14%, the titanium dioxide formed after a combination of oxygen and the α-phase titanium metal crystal is titanium dioxide mainly in a rutile crystal form, such that an oxide layer having a thickness of more than 10 nm can be formed on the surface of the metal cutting board 1. Further, the titanium oxide film layer f can be formed by the stable titanium dioxide in the rutile crystal form, thereby having good antibacterial and anti-sticking capabilities.

In addition, in the present disclosure, the inclined connecting portion 30 is formed on the outer periphery of the first plate body 10, and the inclined connecting portion 30 surrounds the inclined surface of the outer periphery of the first plate body 10, so as to block liquid (for example, liquids from ingredients, water, blood from meat, etc.) from leaking to an outer side of the metal cutting board 1. However, restrictions must also be applied to a slope and a height of the inclined connecting portion 30, so as to prevent collision or interference between an edge of the metal cutting board 1 and the knife used during processing of food. More specifically, in the present embodiment, a ratio of a height H to a width D of the inclined connecting portion 30 is within a range from 1:1 to 1:5, and the height H of the inclined connecting portion 30 is between 2 times and 15 times a thickness t of the metal plate body. It should be noted that, in the present embodiment, the height H of the inclined connecting portion 30 is calculated based on a vertical distance between a top surface of the second plate body 20 and a bottom surface of the first plate body 10. The width D of the inclined connecting portion 30 is calculated based on a distance between an outer periphery and an inner periphery of the inclined connecting portion 30 when observed from a top view.

Through the above arrangement, the inclined connecting portion 30 has a gentle inclination angle, and a ratio of a stamping depth of the metal cutting board 1 (that is, the height H of the inclined connecting portion 30) to the thickness t of the metal plate body can be low, so that a stress concentration of the metal cutting board 1 caused by material deformation can be reduced. In addition, the inclined connecting portion 30 forms a gently inclined surface, so that the metal cutting board 1 of the present disclosure has the shallow tray structure that is suitable for use as a cutting board or a food tray.

Furthermore, during a stamping and forming process of the metal cutting board 1 of the present disclosure, a holding time of a die after stamping and forming is extended to minimize a material rebound after the metal plate body is stamped and formed. The metal cutting board 1 is further homogenized through a heat treatment, so as to eliminate a residual stress of an internal material after the metal plate body is stamped and formed. After the metal cutting board 1 of the present disclosure is formed, a flatness error of the first plate body 10 and the second plate body 20 is less than 1.5 times the thickness of the metal plate body.

Beneficial Effects of the Embodiment

In conclusion, one of the beneficial effects of the present disclosure is that, through having the inclined connecting portion and the second plate body formed on the outer periphery of the first plate body, and through controlling the slope and the height of the inclined connecting portion, the metal cutting board provided by the present disclosure forms the shallow tray structure and is suitable for use as a cutting board and a food tray.

In addition, the metal cutting board of the present disclosure is integrally formed by the titanium metal plate body, and the titanium oxide film is formed on the metal plate body, so as to obtain the antibacterial and anti-sticking effect, and reduce the effect of wearing and tearing of the knife.

Moreover, a structural strength of the metal cutting board of the present disclosure is reinforced through the configuration of the inclined connecting portion on the outer edge of the first plate body, the second plate body, and the folded edge that is a three-dimensional bending structure. Furthermore, through having the inclined connecting portion arranged in a curved path, and through a post-processing heat treatment which eliminates the residual stress, the metal cutting board of the present disclosure is not easily warped, and a good flatness thereof can be maintained.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A metal cutting board, comprising:
   a first plate body having a uniform thickness;
   a second plate body disposed around a periphery of the first plate body, the second plate body and the first plate body being parallel to each other, and the second plate body and the first plate body being positioned on planes of different heights; and
   an inclined connecting portion circumferentially disposed between the first plate body and the second plate body, an inner edge of the inclined connecting portion being connected to an outer edge of the first plate body, and an outer edge of the inclined connecting portion being connected to an inner edge of the second plate body;
   wherein the first plate body, the second plate body, and the inclined connecting portion are integrally formed with each other to form a metal plate body;
   wherein a ratio of a height to a width of the inclined connecting portion is within a range from 1:1 to 1:5;
   wherein, from a top view of the metal cutting board, the inclined connecting portion is disposed between the second plate body and the first plate body along a curved path that is not parallel to an outer periphery of the second plate body;
   wherein the curved path is surroundingly arranged between the outer periphery of the first plate body and an inner periphery of the second plate body;
   wherein the outer periphery of the second plate body has two first sides that are parallel to each other, two second sides that are parallel to each other and perpendicular to the two first sides, and four corners that are connected between the two first sides and the two second sides, wherein the curved path has two first curves adjacent to the two first sides, two second curves adjacent to the two second sides, and a curved connecting portion connected to a junction of the two first curves and the two second curves, wherein each of the two first curves forms an arc-shaped curve and has two ends being away from a corresponding one of the two first sides and a middle portion being curved in a direction towards the corresponding one of the two first sides, and wherein each of the two second curves forms an arc-shaped curve and has two ends being adjacent to a corresponding one of the two second sides and a middle portion being curved in a direction away from the corresponding one of the two second sides;
   wherein the metal plate body is a titanium metal plate;
   wherein a surface of the metal cutting board has a titanium oxide film layer having a thickness greater than 10 nm;
   wherein the titanium oxide film layer is formed by a stable titanium dioxide in a rutile crystal form.

2. The metal cutting board according to claim 1, wherein an outer edge of the second plate body has a folded edge that is bent towards a bottom surface of the metal cutting board.

3. The metal cutting board according to claim 1, wherein a thickness of the metal plate body is between 0.5 mm and 2 mm.

4. The metal cutting board according to claim 3, wherein a flatness error of the first plate body and the second plate body is less than 1.5 times the thickness of the metal plate body.

5. The metal cutting board according to claim 1, wherein the height of the inclined connecting portion is between 2 times to 15 times a thickness of the metal plate body.

6. The metal cutting board according to claim 1, wherein an area of the first plate body is not less than 70% of an area of the metal cutting board.

7. The metal cutting board according to claim 1, wherein the metal cutting board is configured to be heated to a temperature between 500° C. and 800° C. and the temperature is maintained for 1 to 3 hours in a vacuum environment provided by a vacuum furnace, and then oxygen is introduced into the vacuum furnace with the temperature being maintained between 650° C. and 800° C. for 1 to 3 hours, so that the titanium oxide film layer is formed after the surface of the metal cutting board is oxidized.

* * * * *